(No Model.)  
5 Sheets—Sheet 1.
W. P. QUENTELL.
APPARATUS FOR FORMING AND SOLDERING SHEET METAL CANS.
No. 480,034. Patented Aug. 2, 1892.
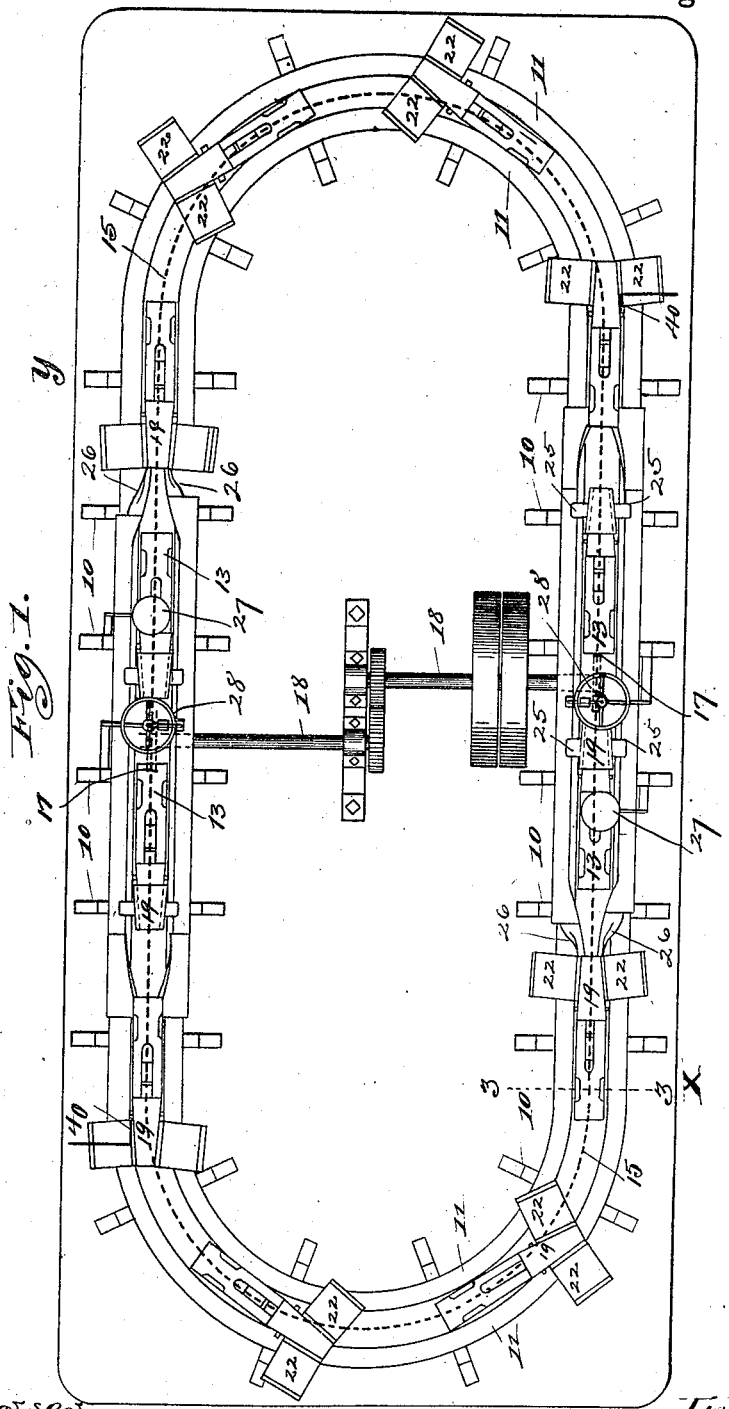
Witnesses,  
Inventor,  
William P. Quentell,  
By Offield Towle & Linthicum  
Attys.

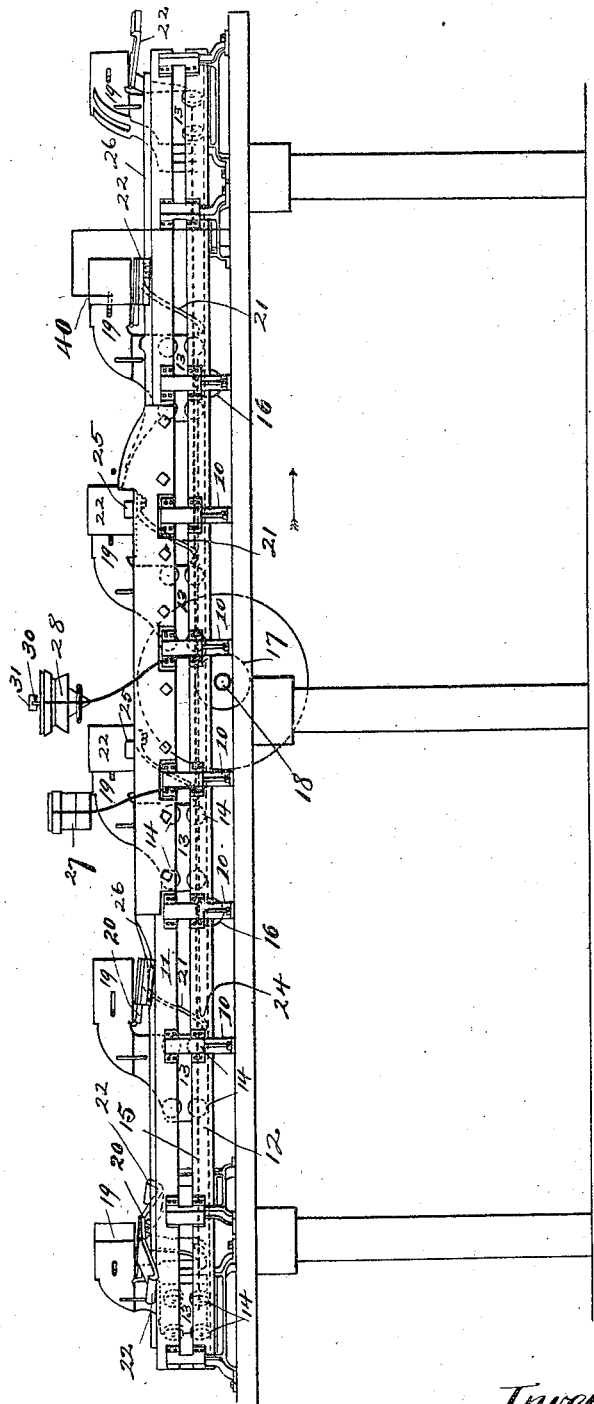

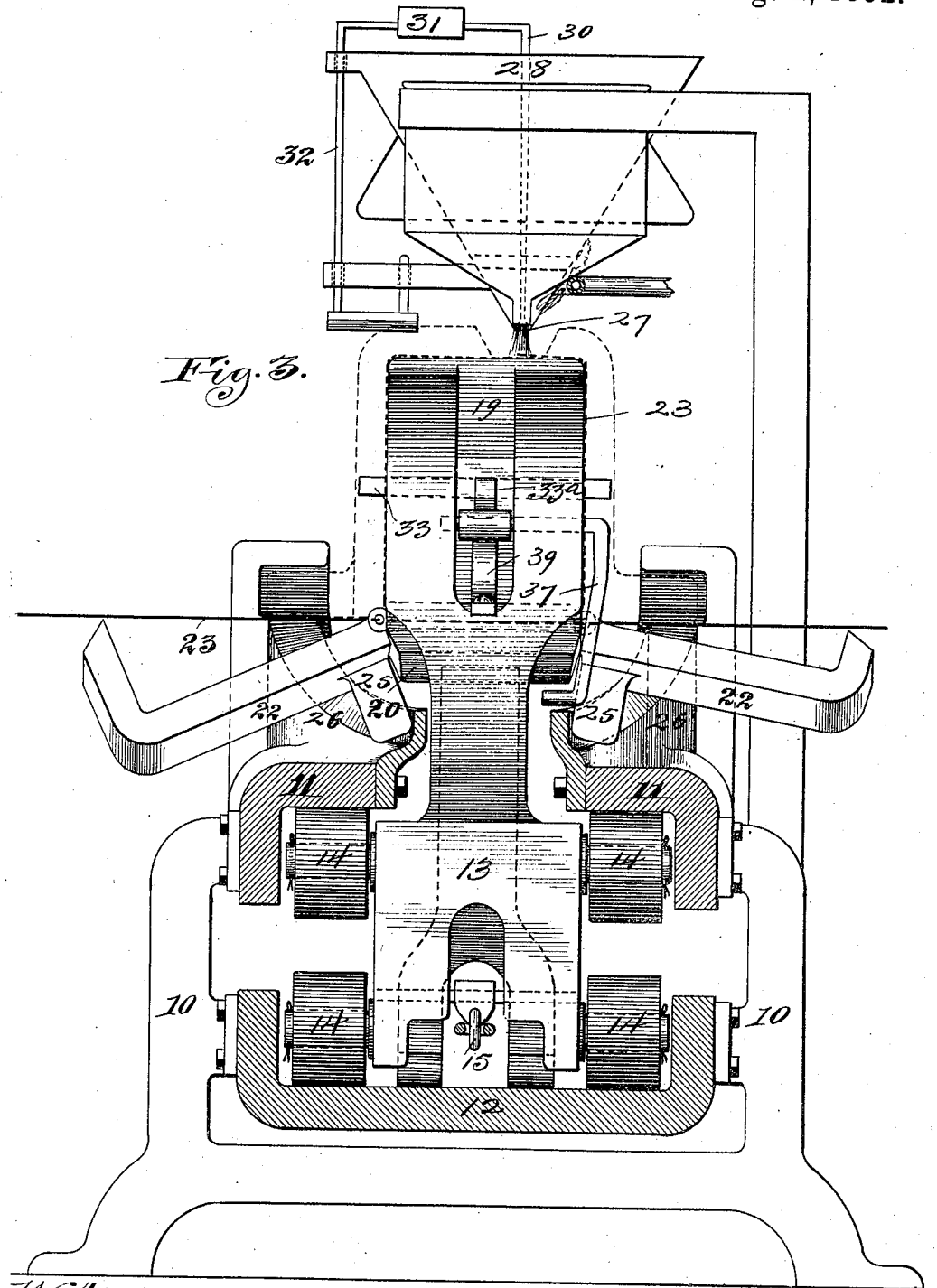

(No Model.)
W. P. QUENTELL.
APPARATUS FOR FORMING AND SOLDERING SHEET METAL CANS.
No. 480,034. Patented Aug. 2, 1892.
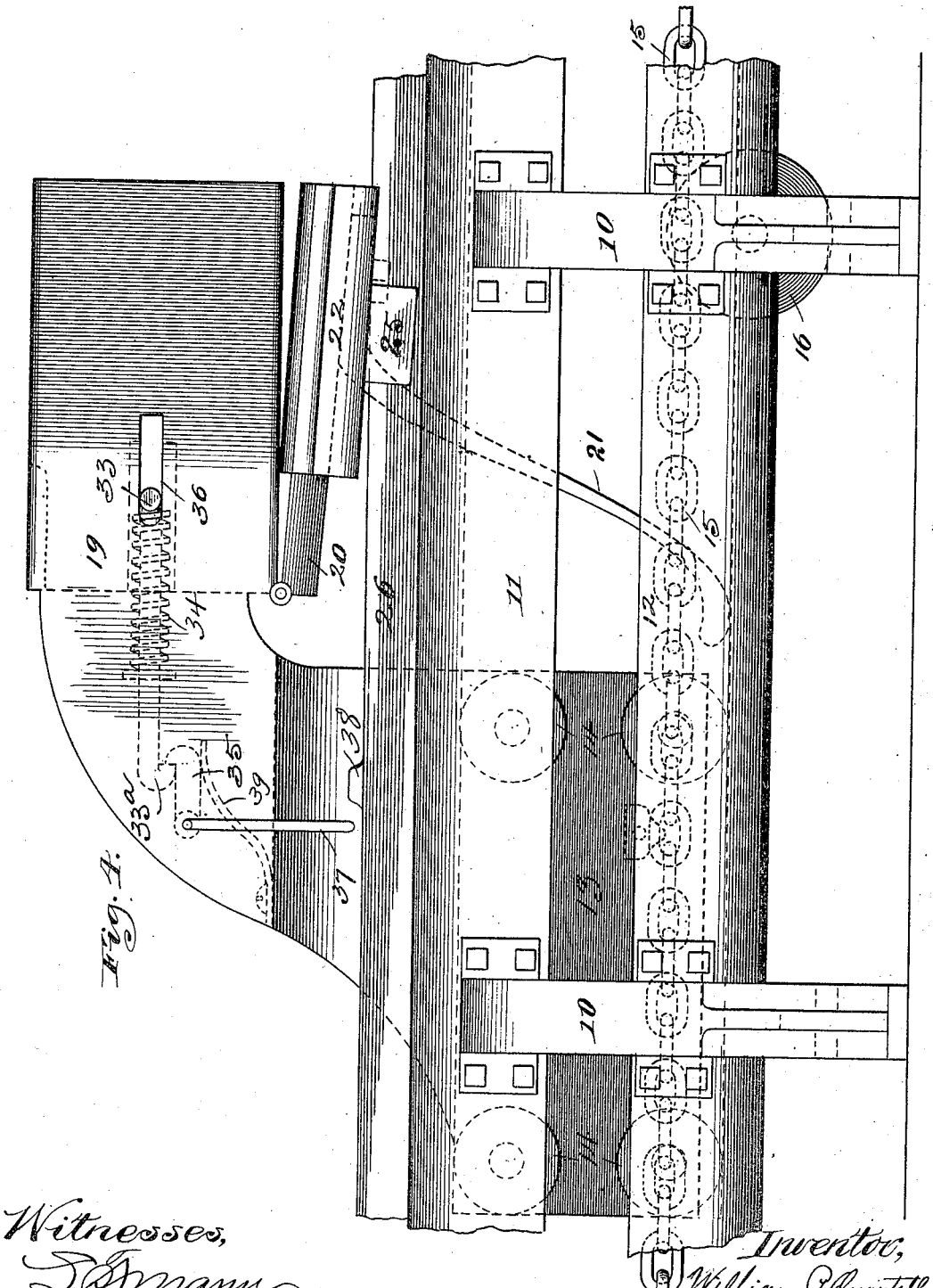

(No Model.)
W. P. QUENTELL.
APPARATUS FOR FORMING AND SOLDERING SHEET METAL CANS.
No. 480,034.  Patented Aug. 2, 1892.
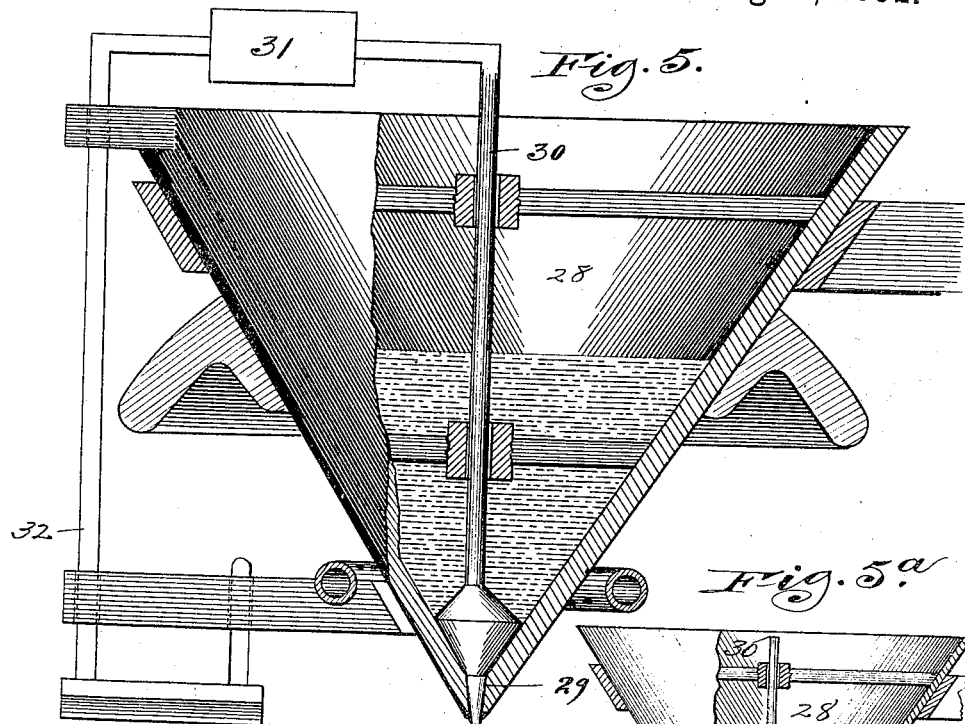
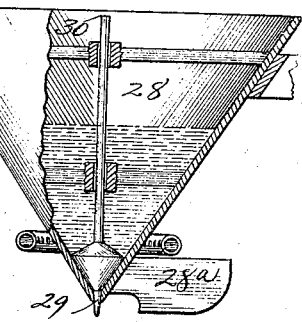
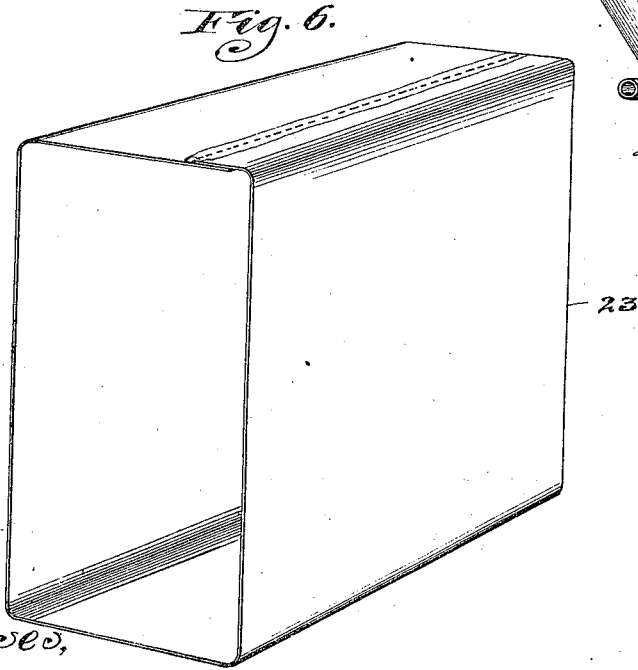

UNITED STATES PATENT OFFICE.

WILLIAM P. QUENTELL, OF KANSAS CITY, MISSOURI.

APPARATUS FOR FORMING AND SOLDERING SHEET-METAL CANS.

SPECIFICATION forming part of Letters Patent No. 480,034, dated August 2, 1892.

Application filed October 31, 1891. Serial No. 410,531. (No model.)

*To all whom it may concern:*

Be it known that I, WILLIAM P. QUENTELL, a citizen of the United States, residing at Kansas City, in the county of Jackson and State of Missouri, have invented certain new and useful Improvements in Apparatus for Forming and Soldering Sheet-Metal Cans, of which the following is a specification.

This invention provides an apparatus for forming sheet-metal cans and soldering the side seams thereof automatically. In the preferred construction it comprises an endless track, carriages moving on said track, a form mounted upon each carriage, hinged folders adapted to bend the sheet of metal around the form, stationary acid and solder wells having automatic provisions for applying first the acid and then the molten solder to the seam, an ejector for stripping and discharging the cans from the form, and suitable devices for actuating the moving parts.

In the operation of the machine the blanks are fed at one or more stations, and the operation of folding, soldering, and discharging is entirely automatic.

The machine is adapted for making either round, square, or pyramidal cans, and I have shown its adaptation for the production of the last-named type of cans.

In the accompanying drawings, which form a part of this specification, Figure 1 is a plan view of the apparatus. Fig. 2 is a side elevation thereof. Fig. 3 is a cross-section on line 3 3 of Fig. 1. Fig. 4 is a side elevation of one of the carriages and forms and part of the track and supporting-frame. Fig. 5 is a sectional detail of the solder-well. Fig. 5ª is a similar view of a modified valve arrangement, and Fig. 6 is a perspective view of one of the can-bodies.

In the drawings, 10 represent frames, upon which are secured upper track-rails 11, said rails being preferably in the form of angle-bars. A channel-bar 12, or angle-bars, the same as the upper track-rails, serves as a lower track. Carriages 13 have rollers 14, which rollers travel beneath and upon the tracks 11 and 12. These carriages are secured to an endless chain 15, carried over idlers 16 and driven by gears 17 on shaft 18. Projecting from the carriages in the nature of a horn are the forms 19, having hinged bed-plates 20, provided with spring-followers 21. These bed-plates have hinged folding members 22, which are caused to operate to fold the metal forming the can-body and retain the metal in said folded position over the form until after the side seam of the can has been soldered.

In operation attendants stationed at X Y feed the metal blanks 23, which are of uniform size to form can-bodies of a desired size, between the forms 19 and the bed-plates 20 as the forms are presented to the attendant by the travel of the carriages. The spring-follower 21, ascending the incline 24 of the bottom of the channel-bar 12, causes the bed-plate to swing on its hinge and hold the metal firmly against the lower side of the form. The folding members 22 are caused to be brought to an upright position by means of the studs 25, riding upon guides 26, said guides being so arranged as to cause one folding member to precede the other in its travel to cause the edges of the metal to overlap each other and form the side seam, as clearly shown by the dotted lines in Fig. 3. The blank being folded over the form and ready for soldering, the overlapped seam is first treated to an acid solution, as at 27, and prepared to receive the liquid solder, which is maintained in a solder-well 28, having a valve 29 in the bottom thereof. The valve-stem 30 bears a weight 31 and has a depending arm 32, which arm is raised by one of the folding members 22 coming in contact therewith, and solder is permitted to flow upon the seam the entire length of the can, when, the folding member passing from beneath the arm 32, the valve-stem descends, closing the valve and stopping the flow of solder until the operation is repeated. The plug of the valve may protrude from the solder-well and be raised by the metal of the can-body coming in direct contact therewith, thus dispensing with the depending arm, as shown in Fig. 5ª. In this figure a metal wiper 28ª is secured to solder-well 28 and heated by the heating-pipe, so as to wipe over the joint. The solder having been applied to and allowed to cool upon the seam of the can, the folding members are allowed to return to their former position. The spring-follower 21 descends a decline upon the lower track, releasing the bed-plate from contact with the cam. An ejector in the form of a T-bar 33, having a spring 34 interposed between its head and a fixed part of the form 19, has a hooked end 33ª, adapted to engage a spring-controlled latch 35, and affords means for automatically removing the can-body from the form and operates as follows: The ends of the T-head project through slots 36 in the sides of the form 19 and are normally held back by the latch 35 at a point beyond where the metal is folded over the form. The arm 37, depending from the pivot of latch 35, engages the projection 38 upon the guide 26, causing the latch to rock downward against the spring 39 and release the hook 33ª of the T-bar 33. Under the impact of the spring 34 T-bar 33 is thrown forward, the projecting ends of the head sliding in the slots 36, striking the edge of the metal and stripping the can-body from the form and depositing it in any suitable receptacle. A spring 40 in the path of the projecting end of the T-head of the bar 33 serves to return the bar to its normal position and lock it with the latch.

Without limiting myself to the precise construction and arrangement of parts, I claim—

1. In an apparatus for forming sheet-metal cans and soldering the side seams thereof, the combination, with a track, of a carriage movable upon said track, a form mounted on said carriage, folders mounted upon the carriage, adapted to engage the blank, and stationary cams adapted to move the folders, and means for soldering the seam, substantially as described.

2. In an apparatus for forming sheet-metal cans and soldering the side seams thereof, the combination, with a track, of a carriage movable upon said track, a form mounted on said carriage, folders mounted upon the carriage, adapted to engage the stock and fold it upon the form, and means for applying the solder to the seam, and an ejector adapted to strip the finished can from the form, substantially as described.

3. In an apparatus for forming sheet-metal cans and soldering the side seams thereof, the combination, with a track, of a carriage movable upon said track, a form mounted on said carriage, a bed-plate to support the blank, folders mounted upon the carriage, adapted to engage the stock and fold it upon the form, and means for applying the solder to the seam, substantially as described.

4. In an apparatus for forming sheet-metal cans and soldering the side seams thereof, the combination, with a track, of a carriage movable upon said track, a form mounted on said carriage, a bed-plate located beneath the form to support the blank, vertically-movable folders hinged to the bed-plate, said folders adapted to engage the stock and fold it upon the form, and means for applying the solder to the seam, substantially as described.

5. In an apparatus for forming sheet-metal cans and soldering the side seams thereof, the combination, with a track, of a carriage movable upon said track, a form mounted on said carriage, folders mounted upon the carriage, adapted to engage the stock and fold it upon the form, and a solder-receptacle having a valve therein whereby to apply the solder to the seam, substantially as described.

6. In an apparatus for forming sheet-metal cans and soldering the side seams thereof, the combination, with a track, of a carriage movable upon said track, a form mounted on said carriage, folders mounted upon the carriage, adapted to engage the stock and fold it upon the form, a solder-receptacle provided with a valve, and means to operate said valve whereby to apply solder to the seam, substantially as described.

7. In an apparatus for forming sheet-metal cans and soldering the side seams thereof, the combination, with a track, of a carriage movable upon said track, a form mounted on said carriage in fixed relation thereto, a bed-plate pivotally mounted on the carriage and adapted to support a blank, folders mounted upon the carriage and adapted to engage the stock and fold it upon the form, and means for applying the solder to the seams, substantially as described.

8. In an apparatus for forming sheet-metal cans and soldering the side seams thereof, the combination, with a horizontal track, of a carriage movable upon said track, a form mounted on said carriage in fixed relation thereto, a pivoted bed-plate to support the blank, pivoted folders mounted upon the carriage and adapted to engage the blank, and suitable means for soldering the seams, substantially as described.

WILLIAM P. QUENTELL.

Witnesses:
C. C. LINTHICUM,
FREDERICK C. GOODWIN.